United States Patent

[11] 3,621,954

[72] Inventors James T. Ligon
 800 South Main, Almont, Mich.;
 David L. Lang, 182 Birch Hill Drive,
 Rochester, Mich. 48063
[21] Appl. No. 4,981
[22] Filed Jan. 22, 1970
[45] Patented Nov. 23, 1971

[54] SPEED CONTROL SYSTEM
 25 Claims, 7 Drawing Figs.
[52] U.S. Cl. ................................................. 192/3 T,
 123/103 R, 180/108, 180/109
[51] Int. Cl. ..........................................F02d 11/08,
 B60k 31/00
[50] Field of Search ............................................ 192/3 T, 3
 TR, 103 R, 103 F; 123/103 R; 180/108, 109

[56] References Cited
 UNITED STATES PATENTS
 3,068,849 12/1962 Thorner ....................... 123/103 R X
 3,298,482 1/1967 Mueller et al. ................ 192/3 T
 3,503,479 3/1970 Canova ....................... 192/103 R

*Primary Examiner*—Allan D. Herrmann
*Attorneys*—Miller, Morriss, Pappas & McLeod and Malcolm R. McKinnon ABSTRACT: A speed control system effective to maintain the speed of a prime mover substantially constant under varying load conditions in which a control member oscillatable at a rate which is a function of the speed of the prime mover is utilized to modulate and control fluid pressure applied to pressure responsive means actuatable to vary the speed of the prime mover.

ENGINE VACUUM

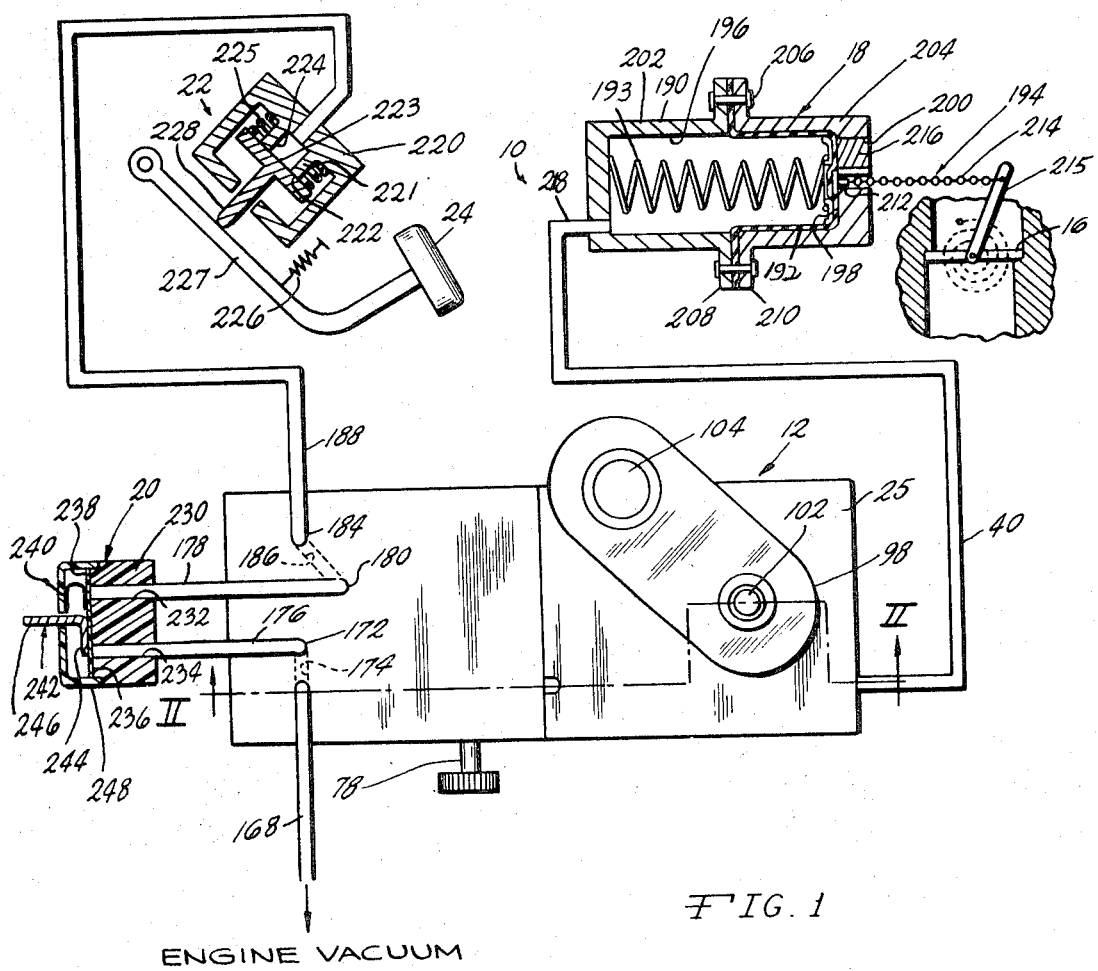
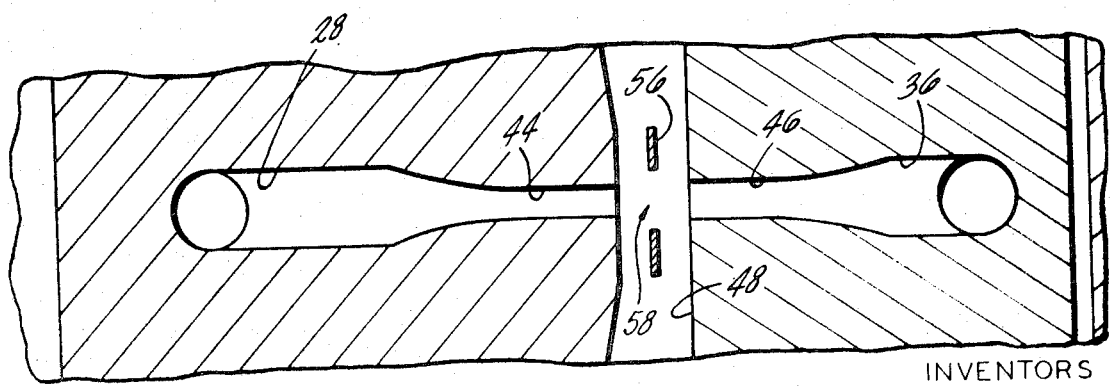

INVENTORS
JAMES T. LIGON
DAVID L. LANG

BY

*Miller, Morriss, Pappas & McLeod*

ATTORNEYS

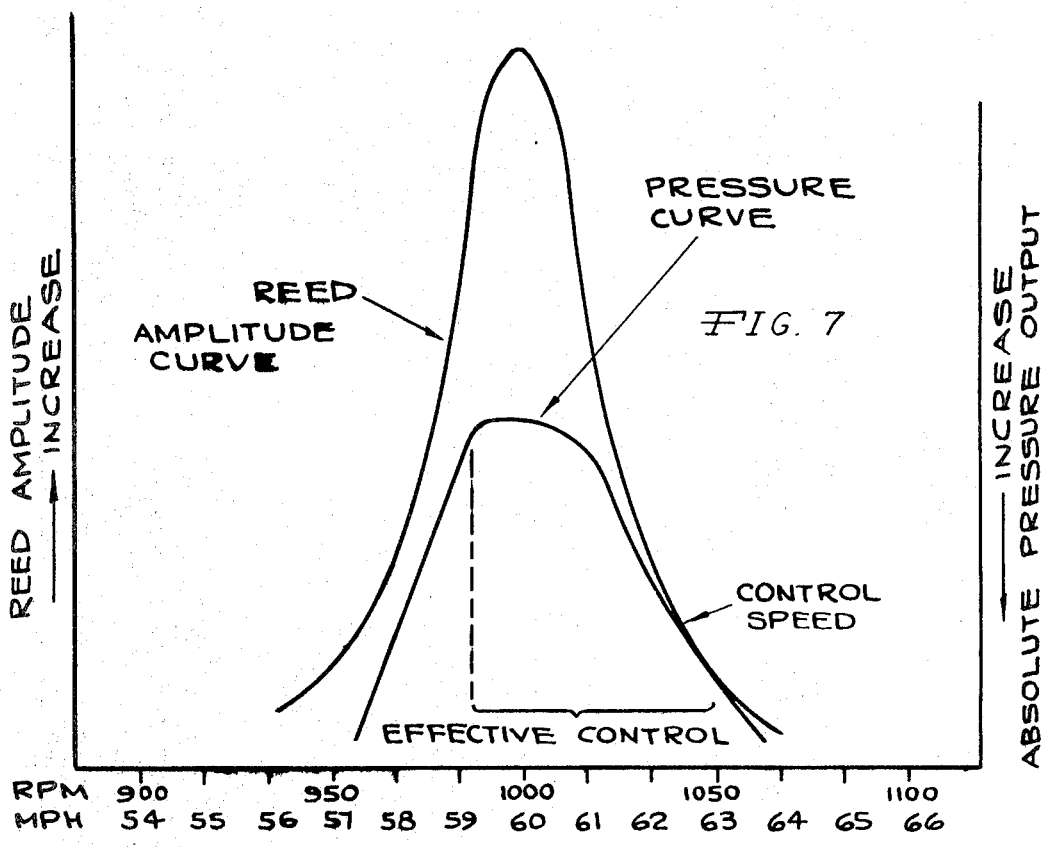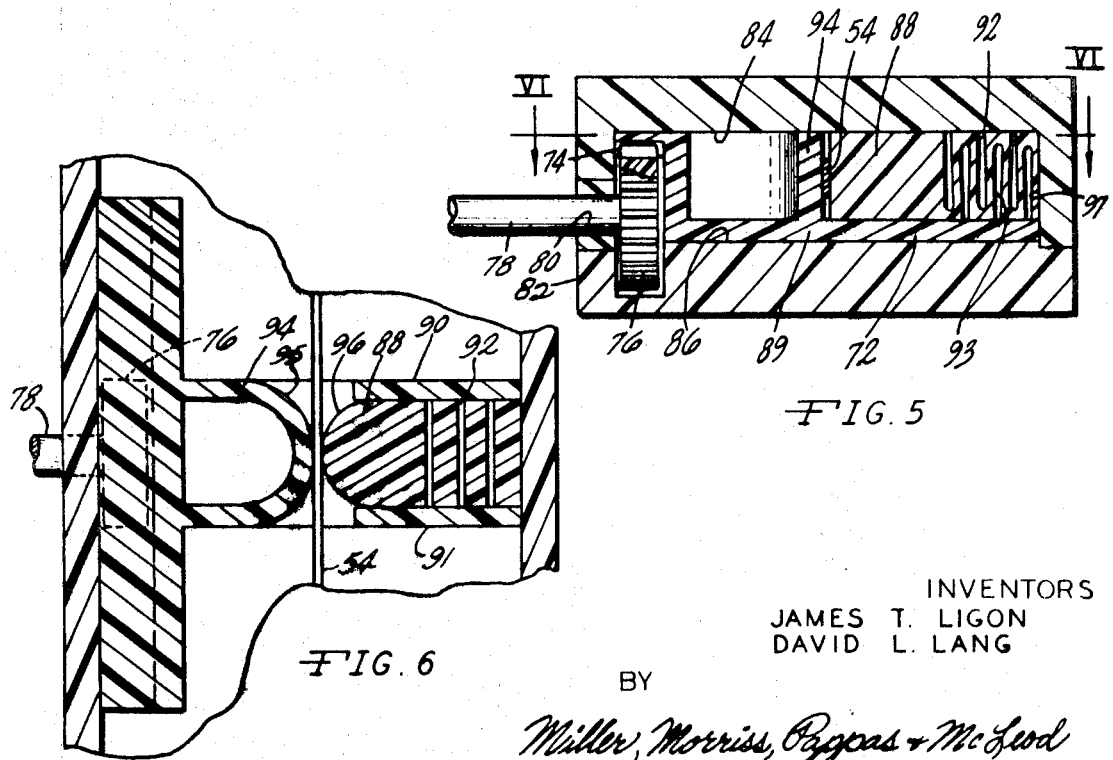

SPEED CONTROL SYSTEM

BRIEF SUMMARY OF THE INVENTION

This invention relates to speed control systems for prime movers and, more particularly, to an improved speed control system incorporating improved means effective to maintain the speed of a prime mover substantially constant under varying load conditions. In a preferred embodiment of the invention a speed control system is provided for controlling the speed of an automotive vehicle although it will be understood that the present invention is applicable to other uses, as for example, in controlling the speed of stationary engines, air motors, electric motors, and other rotating, vibrating and/or oscillating devices operating under varying load conditions.

In order to increase the comfort of driving and to reduce driver fatigue on limited access highways such as interstate highways and turnpikes, it has been found desirable to provide speed control devices which are adapted to control the speed of an automotive vehicle whereby the vehicle is maintained at any desired preselected speed while the vehicle is traveling over varying terrain. Thus it is desirable to increase automatically the power of the engine so as to maintain the speed of the vehicle substantially constant when the vehicle is traveling uphill and to decrease automatically the power of the engine when the vehicle is traveling downhill and thus maintain the vehicle speed at the desired preselected rate.

In the past, speed controls have been utilized to control the speed of prime movers such as the engines of automotive vehicles, stationary engines, air motors, electric motors and other rotating, vibrating and oscillating devices operating under varying load conditions. Prior speed controls of the indicated character have been subject to the defect that they have many complicated components which are relatively expensive to manufacture and assemble with mass production labor and methods and are difficult to maintain over the life of the prime mover, and prior speed controls have become increasing complicated and expensive in the efforts to control reliably the speed of prime movers operating under varying load conditions.

An object of the invention is to overcome disadvantages in prior speed controls of the indicated character and to provide an improved speed control system incorporating improved and greatly simplified means for controlling the speed of a prime mover under varying load conditions.

Another object of the invention is to provide an improved speed control which is relatively compact, which requires relatively little power for operation and which is readily adaptable to meet the speed control requirements of various types of prime movers.

Another object of the invention is to provide an improved speed control which is economically and commercially feasible to manufacture, assemble and test with mass production labor and methods and which is durable and efficient in operation.

Another object of the invention is to provide an improved speed control for prime movers incorporating improved means assuring fail-safe operation of the unit and the associated prime mover.

Still another object of the invention is to provide an improved speed control for controlling the speed of an automotive vehicle whereby the vehicle is automatically maintained at any desired preselected speed while the vehicle is traveling over varying terrain.

The above as well as other objects and advantages of the present invention will become apparent from the following description, the appended claims and the accompanying drawing.

BRIEF DESCRIPTION OF THE DRAWINGS

FIG. 1 is a top plan view of a speed control embodying the present invention, showing the same in association with schematically illustrated components of an automotive vehicle.

FIG. 2 is a sectional elevational view of the structure illustrated in FIG. 1, taken on the line II—II thereof.

FIG. 3 is a sectional view of a portion of the structure illustrated in FIG. 2, taken on the line III—III thereof;

FIG. 4 is a sectional view of a portion of the structure illustrated in FIG. 2, taken on the line IV—IV thereof;

FIG. 5 is a sectional view of a portion of the structure illustrated in FIG. 2, taken on the line V—V thereof;

FIG. 6 is a sectional view of a portion of the structure illustrated in FIG. 5, taken on the line VI—VI thereof; and FIG. 7 is a graph illustrating reed amplitude and output pressure as a function of speed.

DETAILED DESCRIPTION

Referring to the drawings, the present invention is shown embodied in a speed control system, generally designated 10, which is particularly adapted for use in controlling the speed of an automotive vehicle although it will be understood that the present invention is applicable to other uses.

As shown in FIG. 1, in the embodiment of the invention illustrated, the speed control system 10 is comprised of a control unit generally designated 12, which is preferably disposed under the dashboard of the vehicle and which is adapted to be connected to a conventional speedometer cable 14 of an automotive vehicle. The control unit 12 functions to control the position of the carburetor throttle 16 through the agency of a pressure responsive unit 18 as will be described hereinafter in greater detail. The speed control system 10 also includes a manually actuated, normally closed valve 20 which may be of the type disclosed in the copending application of David L. Lang entitled "Valve". The valve 20 is preferably mounted on the turn signal actuating arm of the vehicle or otherwise disposed for convenient access by the vehicle operator so that the valve 20 may be opened by the vehicle operator when it is desired to actuate the control unit 12 to effect automatic speed control of the vehicle. A manually actuated check valve 22 is also provided which is opened when the brake pedal 24 is depressed to brake the vehicle thereby disabling the speed control unit 12 when the vehicle brakes are applied so that the speed of the engine is then controlled solely by the vehicle accelerator pedal.

The speed control unit 12 is comprised of a body 25 which, in the embodiment of the invention illustrated, includes a plurality of laminated body components which are securely fixed to each other to form a unitary structure although it will be understood that the body 25 may be manufactured by other conventional means, as for example, by utilizing conventional molding, casting or machining techniques.

As shown in FIG. 2, the body 25 is provided with an inlet opening 26 through which air at ambient atmospheric pressure is admitted to an input chamber 28 defined by the body 25, the atmospheric air passing through an air filter 30 retained by a cover 32 secured to the body 25 and having inlet openings 34 therein permitting air at ambient atmospheric pressure to pass through the filter 30 and into the input chamber 28. As shown in FIGS. 1 and 2, the body 25 also defines an output chamber 36 connected by a port 38 and a line 40 to the pressure responsive unit 18, a suitable fitting 42 being provided at the port 38 of the body 25 to facilitate connection of the control unit 12 to the line 40 leading to the pressure responsive unit 18.

As shown in FIGS. 2 and 4 the input chamber 28 and the output chamber 36 are provided with opposed, spaced throat portions 44 and 46, respectively, separated by a slot or passageway 48 defined by the body 25, the lower end of the slot or passageway 48 being closed by the wall portion 50 of the body while the upper end of the slot, as viewed in FIG. 2, is open and communicates with a vacuum chamber 52 which extends substantially entirely across the body 25 as viewed in FIG. 1. A reed 54 is provided which is preferably formed from stainless steel or other suitable material, the reed being disposed in the chamber 52 defined by the body 25. A control plate 56 is provided which is fixed to the right end of the reed 54, as viewed in FIG. 2, the control plate 56 preferably being formed of soft magnetic iron or other suitable magnetic material. The control plate 56 depends from the reed 54 and projects into the slot 48 as shown in FIG. 2. As will be described hereinafter in greater detail, the central portion of the control plate 56 defines an opening 58 which is intermittently aligned with the throat portions 44 and 46 of the input and output chambers 28 and 36, respectively, the control plate 56 being adapted to modulate and control the pressurization of the output chamber 36.

The left end portion of the reed 54, as viewed in FIG. 2, is provided with a transversely projecting flange 60 which is adapted to be clamped between spaced substantially parallel wall portions 62 and 64 provided on the body 25, the reed flange portion 60 being retained by a set screw 66 which threadably engages an internal, internally threaded boss 68 provided on the body, the end 70 of the set screw 66 bearing against the relatively flexible wall portion 62 so as to clamp the flange portion 60 of the reed 54 between the wall portions 62 and 64. Obviously, other means may be utilized to fix the end of the reed 54 to the body 25.

Means is provided for selectively fixing the effective oscillating length of the reed 54, such means being comprised of a carrier 72 having rack teeth 74 on one side thereof adapted to mate with a gear 76 fixed to a shaft 78 journaled for rotation in a bearing 80 carried by the front wall 82 of the housing 25. The carrier 72 is supported for translational movement on slides or track surfaces 84 and 86 provided on the body 25.

As shown in FIGS. 5 and 6, a resilient gripping member 88 is provided which may be formed of plastic or other suitable material and which is supported by an integral bridge portion 89 provided on the carrier 72, the gripping member 88 being retained by upstanding flanges 90 and 91 provided on the carrier 72. The body of the gripping member 88 is provided with spaced, oppositely directed slots such as 92 and 93 which open alternately at the top and bottom of the body of the gripping member, as viewed in FIG. 5, thereby providing a spring effect for the gripping member. The reed 54 is disposed intermediate an upstanding, arcuate flange 94 having an arcuate surface 95 and integral with the bridge portion 89 of the carrier 72, and an arcuate surface 96 provided on the gripping member 88. The opposite end of the gripping member 88 bears against a depending surface 97 provided on the body 25. With such a construction, the arcuate surfaces 95 and 96 grip the reed 54 with substantially line contact whereby the effective oscillating length of the reed 54 may be varied by moving the carrier 72 longitudinally of the reed 54, such action being accomplished by manually turning the shaft 78 so that the teeth of the gear 76 which engage the rack teeth 74 move the carrier 72 longitudinally on the slide or track surfaces 84 and 86 relative to the reed. With such a construction, the effective oscillating length of the reed 54 is determined by the line at which the arcuate surfaces 95 and 96 grip the reed 54.

As shown in FIG. 2, the body 25 also includes a gear case portion 98 in which a pair of mating spur gears 99 and 100 are fixed on shafts 102 and 104, respectively, the shaft 102 being driven by the speedometer cable 14 and driving the shaft 104 through the agency of the mating gears 99 and 100. The shaft 104 in turn drives a speedometer cable connected to the vehicle speedometer (not shown) in a conventional manner. A bar magnet 106 is provided which is fixed to the shaft 102 and disposed within a chamber 108 isolated from the chamber 52, the magnet 106 being disposed in relatively close proximity to the reed 54. With such a construction, the magnet 106 rotates at a speed directly proportional to the speed of the vehicle and the magnet 106 effects oscillation of the reed 54 at a frequency and amplitude which are a function of the speed of the vehicle and the effective length of the reed as determined by the line at which the arcuate surfaces 95 and 96 grip the reed. It will be understood that other means, such as electromagnetic means, may be utilized to provide an alternating magnetic field effective to oscillate the reed 54 at a frequency and amplitude which are a function of the speed of the vehicle and the effective length of the reed.

In order to effect a slight damping of the oscillatory movement of the reed 54, a bar magnet 110 is provided which is disposed in parallel relationship with the throat portion 46 and fixed to the wall 111 provided on the body 25, the end 112 of the magnet 110 being located at a position near, but spaced from, the control plate 56.

During operation of the control unit 12 the pressure in the chamber 52 is maintained substantially constant at a pressure less than ambient atmospheric pressure, and means is provided for maintaining the pressure in the vacuum chamber 52 at the desired value. As shown in FIG. 2, the body 25 defines a chamber 113 which is open to atmosphere through a passageway 114, and a pair of concentric chambers 115 and 116 are provided in the body, the chambers 115 and 116 being separated by a tubular boss 118 forming a valve seat 120 on the end thereof. The outer chamber 116 communicates with the vacuum chamber 52 through passageways 122 and 124 defined by the housing 25, the passageways 122 and 124 being connected through an opening 126 formed in a diaphragm 128 which extends across the lower chamber 113 between the concentric chambers 115 and 116 so as to separate the lower chamber 113 from the concentric chambers 115 and 116 and to seal the concentric chambers 115 and 116 from each other when the diaphragm 128 engages the seat 120. A coil spring 130 is provided one end which bears against the wall 132 defining the end of the chamber 116 while the opposite end of the spring 130 bears against the diaphragm 128. The force exerted by the spring 130 is sufficient to force the diaphragm 128 off from the seat 120 when the pressures on opposite sides of he diaphragm are substantially equal thereby providing communication between the concentric chambers 115 and 116 when the diaphragm 128 is disengaged from the seat 120.

The inner chamber 115 communicates with an annular chamber 134 spacedly surrounding an inlet passageway 136 defined by a tubular boss portion 138 provided in the body 25, the boss portion 138 forming a seat 140 on the end thereof. A pair of diaphragms 142 and 144 are provided the peripheral portions of which are separated by a diaphragm separator 146 defining an opening 148 while the central portions of the diaphragms 142 and 144 are fused together as at 150 so that the diaphragms move with each other in response to pressure differentials. The space 152 intermediate the diaphragms 142 and 144 is open to ambient atmospheric pressure through a port 154 provided in the separator 146. The lower diaphragm 144 is adapted to seat on the valve seat 140 and is urged against the seat 140 by a conical spring 156, the lower end of which bears against the central portion of the upper diaphragm 142 while the upper end of the conical spring 156 bears against the top wall 158 of the body 25. The top wall 158 of the housing also defines a chamber 160 the cross-sectional area of which is greater than the combined cross-sectional areas of the concentric chamber 134 and the inner passageway 136 confronting the diaphragm 144. A passageway 162 is provided in the body connecting the lower chamber 134 with the upper chamber 160 and a fluid passageway 164 is also provided connecting the inner passageway 136 with an outlet port 166 which is connected to a source of vacuum such as the intake manifold of the vehicle engine (not shown) by a line 168, a suitable fitting 170 being provided to facilitate connection of the port 166 to the line 168. The port 166 is also connected to a fitting 172 by a recess 174 provided in the top wall 158, the fitting 172 being connected by a line 176 to one side of the normally closed valve 20, the other side of the valve 20 being connected by a line 178 to a fitting 180 communicating with a port 182. An additional fitting 184 is provided which also communicates with the port 182 through a recess 186 defined by the top wall 158, the fitting 184 being connected by a line 188 to the check valve 22 operated by the brake pedal 24. The port 182 is connected to the upper chamber 160 as illustrated in FIG. 2.

The pressure responsive member 18 is comprised of a housing 190 in which a rolling diaphragm 192 biased by a spring 193 responds to pressure differentials on opposite sides thereof to move an output chain member 194 which in turn actuates the carburetor throttle 16, the pressure differential acting on the diaphragm 192 being under the control of the control unit 12. In the embodiment of the invention illustrated, when the control unit 12 is operating, vacuum exists in the chamber 196 formed in the housing 190 on one side of the diaphragm 192 while the chamber 198 formed in the housing on the other side of the diaphragm 192 is open to ambient atmosphere through openings 200 provided in the housing 190. The housing 190 is comprised of a housing member 202 and a housing member 204 which may be joined together in any conventional manner. In the embodiment of the invention illustrated, the housing members 202 and 204 are joined together in fluidtight relationship by rivets 206 which pass through flanges 208 and 210 formed on the periphery of the housing members and clamp the peripheral portions of the diaphragm 192 therebetween. The output chain member 194 includes a head portion 212 which is fixed to the diaphragm 192 in any desired or conventional manner and a chain portion 214 which passes through the bottom housing member 204 and is connected to the carburetor throttle actuating arm 215 as illustrated in FIG. 1. The openings 200 provided in the housing member 204 permit air under ambient atmospheric pressure to enter the chamber 198 through a filter 216 carried by the housing member 204 while the housing member 202 is provided with a fitting 218 facilitating the connection of the vacuum line 40 leading from the output chamber 36 of the control unit 12 to the pressure responsive unit 18.

As shown in FIG. 1, the check valve 22 actuated by the brake pedal 24 is normally closed but upon actuation of the brake pedal, the check valve 22 is opened thereby admitting air under ambient atmospheric pressure into the line 188 leading to the upper chamber 160 of the control unit as previously described. The check valve 22 is comprised of a body 220 having an internal boss 220 providing a valve seat 222 against which a valve 223 seats when the brake pedal 24 is in a released condition so as to close the chamber 224 leading to the line 188. The valve 223 is biased toward the open position by a spring 225 which exerts less force than the pedal return spring 226. With such a construction, the valve 223 is held seated against the seat 222 by the brake pedal arm 227 bearing against the stem 228 of the valve 223. When the brake pedal 24 is depressed to actuate the vehicle brakes, the spring 225 moves the valve 223 off the seat 222 thereby admitting air under ambient atmospheric pressure into the line 188 through the chamber 224.

The valve 20 is normally closed and is adapted to be manually opened by the vehicle operator to actuate the control unit 12 by applying a momentary vacuum to the chamber 160 whereby the diaphragm 144 disengages from the valve seat 140 against the biasing action of the spring 156 so as to effect direct communication between the outer chamber 138 and the source of vacuum through the chamber 136 and the passageways 164 and 166.

As more fully described in the aforementioned copending application, the valve 20 is comprised of a body 230 defining a pair of spaced fluid passageways 232 and 234 which extend through the body 230 and which terminate adjacent a common valve seat 236 provided on the body 230. A flexible, impervious diaphragm 238 is provided the peripheral portions of which are fixed to the body in fluidtight relationship and in encompassing relationship with respect to both of the passageways 232 and 234. A resilient spring 240 biases the diaphragm 238 against the seat 236 so as to close communication between the passageways 232 and 234. An actuating member 242 is provided having a flange portion 244 fixed to the diaphragm and a leg portion 246 projecting outwardly through a cap 248 carried by the body 230. When manual force is applied to the leg 246 of the actuating member 242, the diaphragm 238 disengages from the seat 236 thereby opening communication between the passageways 232 and 234 through the space between the diaphragm and the seat. The passageway 232 is connected to the line 178 leading to the chamber 160 while the passageway 234 is connected to the line 176 which communicates with the source of vacuum through the recess 174 and the line 168 so that momentary opening of the valve 20 effects the application of a momentary vacuum to the chamber 160 as previously described.

In the operation of the speed control system, the vehicle operator initially rotates the control shaft 78 manually so that the reed gripping member 88 is positioned in the manner previously described to grip the reed 54 whereby the effective length of the reed is such that the frequency and amplitude of oscillation of the reed will cause the control plate 56 to modulate the pressure in the output chamber 36 to the desired value as determined by the rotational speed of the magnet 106 so that the pressure in the output chamber 36 is modulated as a function of the speed of the vehicle. The modulated pressure in the output chamber 36 determines the pressure or degree of vacuum in the chamber 196 of the pressure responsive member 18 and thus the rolling diaphragm 192 is positioned as a function of the speed of the vehicle, the position of the rolling diaphragm in turn determining the position of the carburetor throttle plate 16. Assuming that the brake pedal 24 is in a released position so that the check valve 22 is closed thereby preventing the entrance of air into the adjacent line 188, the operator opens the valve 20 thereby placing the upper chamber 160 in communication with the source of vacuum, such communication being effected through the line 178 leading from the valve 20 which is connected to the source of vacuum through the line 178 and the line 168 as previously described. At this time the chamber 134 is also placed in communication with the source of vacuum through the bypass passageway 162 while the inner chamber 136 is directly in communication with the source of vacuum through the passageways 164 and 166. Since the space 152 between the dual diaphragms 142 and 144 is open to atmospheric pressure through the port 154, and the effective area of the upper diaphragm 142 relative to the upper chamber 160 is greater than the effective area of the lower diaphragm 144 relative to the concentric chambers 134 and 136, atmospheric pressure acting on the upper diaphragm 142 overcomes the force of the conical spring 156 exerted on the upper diaphragm 142 so as to move both the upper and lower diaphragms 142 and 144, which are joined at 150, upwardly thereby disengaging the lower diaphragm 144 from the seat 140 and placing the concentric chambers 134 an 136 directly in communication with each other. The full vacuum of the intake manifold is then applied to the chamber 115. Since the regulator diaphragm 128 is normally disengaged from the associated valve seat 120 due the action of the coil spring 130, the chamber 52 in which the reed 54 is disposed in placed in communication with the source of vacuum through the chamber 116 and the passageways 122 and 124 thereby reducing the pressure in the chamber 52. However, since the chamber 113 is open to atmospheric pressure through the port 114, the pressure differential acting upon the opposite sides of the regulator diaphragm 128 when the pressure in the chamber 116 is reduced tends to create a force sufficient to overcome the force of the coil spring 130 acting on the regulator diaphragm 128 with the result that the regulator diaphragm 128 again engages the adjacent valve seat 120 to close communication between the chamber 115 and the chamber 116. The regulator diaphragm 128 thus opens and closes against the adjacent valve seat 120 to modulate the pressure in the vacuum chamber 52 and maintain the pressure in the chamber 52 substantially constant. In the embodiment of the invention illustrated, the coil spring 130 is calibrated so that the pressure in the vacuum chamber 52 is maintained at a vacuum of approximately 6 inches of mercury and such vacuum is maintained even though the vacuum in the intake manifold of the engine varies widely under normal operating conditions.

The operator then depresses the vehicle accelerator pedal so as to accelerate the vehicle to the speed which he desires to maintain constant. As the speed of the vehicle increases, the speed of rotation of the magnet 106 increases with the result that the reed 54 begins to oscillate due to the magnetic action of the magnet 106 acting on the reed, the magnet 110 providing a slight damping effect to the oscillation of the reed and control member 56. In the initial stages of operation the air entering through the inlet 26 and the input chamber 28 is permitted to flow directly through the opening 58 defined by the control plate 56 into the throat 46 of the output chamber 36 so that the pressure in the chamber 196 if the pressure responsive unit 18 is initially substantially atmospheric pressure and the pressures on opposite sides of the rolling diaphragm 192 are substantially equal. It should be understood that the force exerted by the rolling diaphragm 192 is sufficient to move the throttle 16 in the absence of manual pressure on the vehicle accelerator pedal but the force exerted by the rolling diaphragm may be overcome by exerting sufficient manual force on the vehicle accelerator pedal.

As the vehicle approaches the desired preselected speed, the control plate 56 carried by the reed 54 oscillates between the opposing throat portions 44 and 46 of the input chamber 28 and the output chamber 36, respectively, following the reed amplitude curve illustrated in FIG. 7, thereby modulating the pressure in the output chamber 36 by intermittently blocking the flow of air under atmospheric pressure emanating from the throat 44 of the input chamber 28. Since the throat 46 of the output chamber 36 is open to the vacuum chamber 52 through the slot 48 disposed intermediate the throat portions 44 and 46 of the input and output chambers 28 and 36, respectively, the pressure in the output chamber 36 is reduced, the pressure in the chamber 36 following the pressure curve illustrated in FIG. 7, thereby reducing the pressure in the chamber 196 of the pressure responsive unit 18 with the result that the rolling diaphragm 192 moves to the left, as viewed in FIG. 1, so that the rolling diaphragm is disposed in a position whereby the output chain member 194 is disposed to maintain the carburetor throttle plate 16 in a position for maintaining the speed of the vehicle at the desired rate. Thus, as the operator depresses the vehicle accelerator pedal, the output member 194 is automatically positioned by the rotational movement of the carburetor throttle control arm and when the vehicle reaches the desired speed, the pressure in the upper chamber 196 of the pressure responsive member 18 is reduced whereby the pressure differential between the upper and lower chamber 196 and 198 is such as to maintain the rolling diaphragm 192 at the preselected position when the manual effort is removed from the vehicle accelerator pedal.

Assuming that the vehicle is traveling over varying terrain at a preselected control speed of 62.5 m.p.h. as illustrated in FIG. 7 and the vehicle begins to move uphill, the vehicle will automatically begin to decelerate due to the uphill movement of the vehicle until additional power is provided by the vehicle engine. As the vehicle begins to decelerate, the amplitude of the reed 54 will increase as illustrated in FIG. 7 since the magnet 106 is rotating at a slower rate with the result that flow of air from the throat 44 of the input chamber 28 to the throat 46 of the output chamber 36 will be interrupted by the marginal portions of the plate 56 thereby reducing the pressure in the output chamber 36 and the pressure in the chamber 196 of the pressure responsive unit 18. The reduction in pressure in the upper chamber 196 of the pressure responsive unit 18 increases the pressure differential acting on opposite sides of the diaphragm 192 with the result that the diaphragm moves to the left, as viewed in FIG. 1, so as to open the carburetor throttle plate 16 thereby increasing the power of the engine and increasing the speed of the vehicle. When the vehicle reaches the preselected speed, the magnet 106 will again rotate at the rate sufficient to oscillate the reed 54 and control plate 56 at the desired amplitude whereby the pressure in the output chamber 36 is maintained at a value which will hold the rolling diaphragm 192 and the carburetor throttle plate 16 in a position to maintain the preselected vehicle speed.

Assuming that the vehicle begins to travel downhill, thereby automatically increasing the speed of the vehicle above the preselected speed of 62.5 m.p.h., the magnet 106 will rotate at a faster rate with the result that the amplitude of oscillation of the reed 54 and control plate 56 will decrease as illustrated in FIG. 7 so that the flow of air from the throat 44 of the chamber 28 to the throat 36 of the chamber 36 will be increased and the pressure in the output chamber 36 will be increased thereby increasing the pressure in the chamber 196 of the pressure responsive unit 18. Such increase in pressure in the chamber 196 of the pressure responsive unit in turn causes the rolling diaphragm 192 to move to the right, as viewed in FIG. 1, with the result that the output chain member 194 tends to become slack and the carburetor throttle 16 which is biased toward the closed position tends to close so as to reduce the engine power and reduce the speed of the vehicle. When the vehicle reaches the preselected speed, the reed 54 and control plate 56 will again oscillate at a rate and with the desired amplitude sufficient to maintain the vacuum in the output chamber 36 at the desired value whereby the speed of the vehicle is maintained constant, as previously described.

When the operator of the vehicle applies the brake pedal 24, the check valve 22 is opened to atmosphere thereby opening the chamber 160 to atmosphere through the line 188 and port 182 and the opposed chamber 134 to atmosphere through the passageway 162. With atmospheric pressure in the chamber 160 acting on the upper diaphragm 142, for forces exerted by the dual diaphragms and the conical spring 156 are sufficient to close the lower diaphragm 144 against the seat 140 thereby closing communication between the chambers 134 and 136. Since atmospheric pressure is also present in the chamber 115, the equalized pressures acting on the regulator diaphragm 128 cause the regulator diaphragm 128 to unseat from the adjacent valve seat 120 due to the action of the coil spring 130 thereby opening the vacuum chamber 52 to atmospheric pressure with the result that atmospheric pressure is permitted to enter the output chamber 36 thereby equalizing the pressures in the chambers 196 and 198 acting on the rolling diaphragm 192 so that the position of the carburetor throttle plate 16 is determined solely by the position of the vehicle accelerator pedal. Any malfunctions which result in failure of the reed to oscillate or any failure in the vacuum system also results in the equalization of the pressures in the chambers 196 and 198 so that the speed control system no longer controls the position of the carburetor throttle and fails in a safe condition.

If the vehicle operator desires to turnoff the speed control unit 12 temporarily, such action may be accomplished by manually turning the shaft 78 so as to move the carrier 72 to the left, as viewed in FIG. 2, so as to close the port 124 thereby closing communication of the vacuum chamber 52 with the source of vacuum. The pressures in the chambers 52, 36, 196 and 198 then equalize at ambient atmospheric pressure so that the speed control unit no longer controls the position of the carburetor throttle.

While a preferred embodiment of the invention has been illustrated and described, it will be understood that various changes and modifications may be made without departing from the spirit of the invention.

What is claimed is:

1. A speed control system for automotive vehicles having an engine and a brake, said system comprising, in combination, a control unit including a housing defining an input chamber communicating with ambient atmospheric pressure, an output chamber separated from said input chamber and a vacuum chamber communicating with both said input chamber and said output chamber, a control member disposed between said input chamber and said output chamber and moveable to interrupt the flow of fluid between said input chamber and said output chamber, pressure responsive means effective to control the speed of said engine, said output chamber communicating with said pressure responsive means, means including magnetic means driven by said engine and effective to move said control member as a function of the speed of said engine whereby said control member modulates the flow of fluid between said input and output chambers and the pressure in said output chamber as a function of the speed of said engine, and means for maintaining the pressure in said vacuum chamber substantially constant and at a pressure below ambient atmospheric pressure.

2. The combination as set forth in claim 1 including a source of vacuum, and manually operable valve means controlling the flow of fluid between said vacuum chamber and said source of vacuum.

3. The combination as set forth in claim 1 including means operable upon the actuation of said vehicle brake and effective to close communication between said vacuum chamber and said source of vacuum and open said vacuum chamber to ambient atmospheric pressure.

4. In a speed control system for prime movers, the combination including:
a body defining a pair of spaced confronting chambers separated by a fluid passageway, one of said chambers communicating with a first source of fluid pressure, said passageway communicating with a second source of pressure lower in value than said first source of pressure, pressure responsive means connected to the other of said chamber, reed means magnetically oscillatable in accord with the speed of said prime mover for control modulating the flow of fluid between said chamber; and
means driving said reed to oscillate, said driving means having a drive frequency proportional to the drive speed of said prime mover.

5. In a speed control system for prime movers, the combination including:
a body defining a pair of spaced confronting chambers separated by a fluid passageway, one of said chambers communicating with a first source of fluid pressure, said passageway communicating with a second source of pressure lower in value than said first source of pressure, pressure responsive means connected to the other of said chambers and magnetic means acting on reed means oscillatable as a function of the speed of said prime mover for control modulating the flow of fluid between said chambers.

6. A speed control system for prime movers, said system comprising, in combination, a control unit including a housing defining an input chamber communicating with ambient atmospheric pressure, an output chamber separated from said input chamber and a vacuum chamber communicating with both said input chamber and a vacuum chamber communicating with both said input chamber and said output chamber, a control member disposed between said input chamber and said output chamber and moveable to interrupt the flow of fluid between said input chamber and said output chamber, pressure responsive means effective to control the speed of said prime mover, said output chamber communicating with said pressure responsive means, means including reed means effective to move said control member as a function of the speed of said prime mover whereby said control member modulates the flow of fluid between said input and output chambers as a function of the speed of said prime mover, and means for maintaining the pressure in said vacuum chamber substantially constant and at a pressure below ambient atmospheric pressure.

7. The combination as set forth in claim 6 including a source of vacuum, and means including manually operable valve means controlling the flow of fluid between said vacuum chamber and said source of vacuum.

8. The combination as set forth in claim 6 including diaphragm means effective to close communication between said vacuum chamber and said source of vacuum and open said vacuum chamber to atmospheric pressure.

9. A speed control unit comprising, in combination, a body defining an input chamber having an outlet nozzle, said input chamber being in constant communication with the ambient atmosphere, said body defining an output chamber having an inlet nozzle spacedly confronting said outlet nozzle of said input chamber, a vacuum chamber communicating with both said outlet nozzle and said inlet nozzle, a control member disposed between said outlet and inlet nozzles and moveable between blocking and unblocking positions relative to said nozzles, means for moving said control member at a predetermined rate between said blocking and unblocking positions whereby said control member modulates the flow of air between said outlet and said inlet nozzles, and means for maintaining the pressure in said vacuum chamber substantially constant and at a value less than ambient atmospheric pressure.

10. The combination as set forth in claim 9 wherein said means for moving said control member includes an oscillatable reed.

11. The combination as set forth in claim 10 and means for varying the effective length of said reed.

12. The combination as set forth in claim 9 including magnetic means effective to oscillate said reed.

13. The combination as set forth in claim 10 including a carrier mounted on said body for translational movement relative to said reed, means for effecting translational movement of said carrier, and means carried by said carrier and releasably gripping said reed.

14. The combination as set forth in claim 9 including dual diaphragm means carried by said body and controlling communicating between said vacuum chamber and a source of vacuum.

15. The combination as set forth in claim 12 including means for rotating said magnetic means.

17. The combination as set forth in claim 10, said control member including a control plate defining a centrally disposed opening normally aligned with said outlet and said inlet nozzles and providing a fluid path therebetween, said control plate being mounted on one end of said reed and being moveable upon oscillation of said eed into and out of blocking relation with said fluid path.

18. The combination as set forth in claim 10 including means for damping oscillation of said reed.

19. A speed control unit for automotive vehicles, said unit comprising, in combination, a body defining an input chamber having an outlet nozzle, said input chamber being in constant communication with the ambient atmosphere, said body defining an output chamber having an inlet nozzle spacedly confronting said outlet nozzle of said input chamber, a vacuum chamber communicating with both said outlet nozzle and said inlet nozzle, a control member disposed between said outlet and inlet nozzles and moveable between blocking and unblocking positions relative to said nozzles, means including an oscillatable reed effective to move said control member at a predetermined rate between said blocking and unblocking positions whereby said control member modulates the flow of air between said outlet and said inlet nozzles, means for varying the effective length of said reed, magnetic means effective to oscillate said reed, and means including diaphragm means for maintaining the pressure in said vacuum chamber substantially constant and at a value less than ambient atmospheric pressure.

20. The combination as set forth in claim 19 including a carrier mounted on said body for translational movement relative to said reed, rack and pinion means for effecting translational movement of said carrier, and means carried by said carrier and releasably gripping said reed.

21. The combination as set forth in claim 19 including dual diaphragm means carried by said body and effective to open said vacuum chamber to atmospheric pressure.

22. The combination as set forth in claim 19 including means for rotating said magnetic means at a speed proportional to the speed of a vehicle.

23. The combination as set forth in claim 19 including spring means biasing said dual diaphragm means.

24. The combination as set forth in claim 19 including means for damping oscillation of said reed.

25. The combination as set forth in claim 19, said control member including a control plate defining a centrally disposed opening normally aligned with said outlet and said inlet nozzles and providing a fluid path therebetween, said control plate being mounted on one end of said reed and being moveable upon oscillation of said reed into and out of blocking relation with said fluid path.

* * * * *

UNITED STATES PATENT OFFICE
CERTIFICATE OF CORRECTION

Patent No. 3,621,954             Dated November 23, 1971

Inventor(s) James T. Ligon, et al

It is certified that error appears in the above-identified patent and that said Letters Patent are hereby corrected as shown below:

Column 4, line 31, "he" should read -- the -- . Column 5, line 36, "220" should read -- 221 -- . Column 6, line 29, "178" should read -- 176 -- ; line 45, "an" should be -- and -- ; line 50, "in" after disposed should read -- is -- . Column 8, line 25, "for" should be -- the -- . Column 9, line 46, delete "and a vacuum chamber communicating with both said input chamber". Column 10, line 35, "eed" should be -- reed -- .

Signed and sealed this 17th day of October 1972.

(SEAL)
Attest:

EDWARD M. FLETCHER, JR.            ROBERT GOTTSCHALK
Attesting Officer                  Commissioner of Patents